United States Patent Office 3,427,637
Patented Feb. 11, 1969

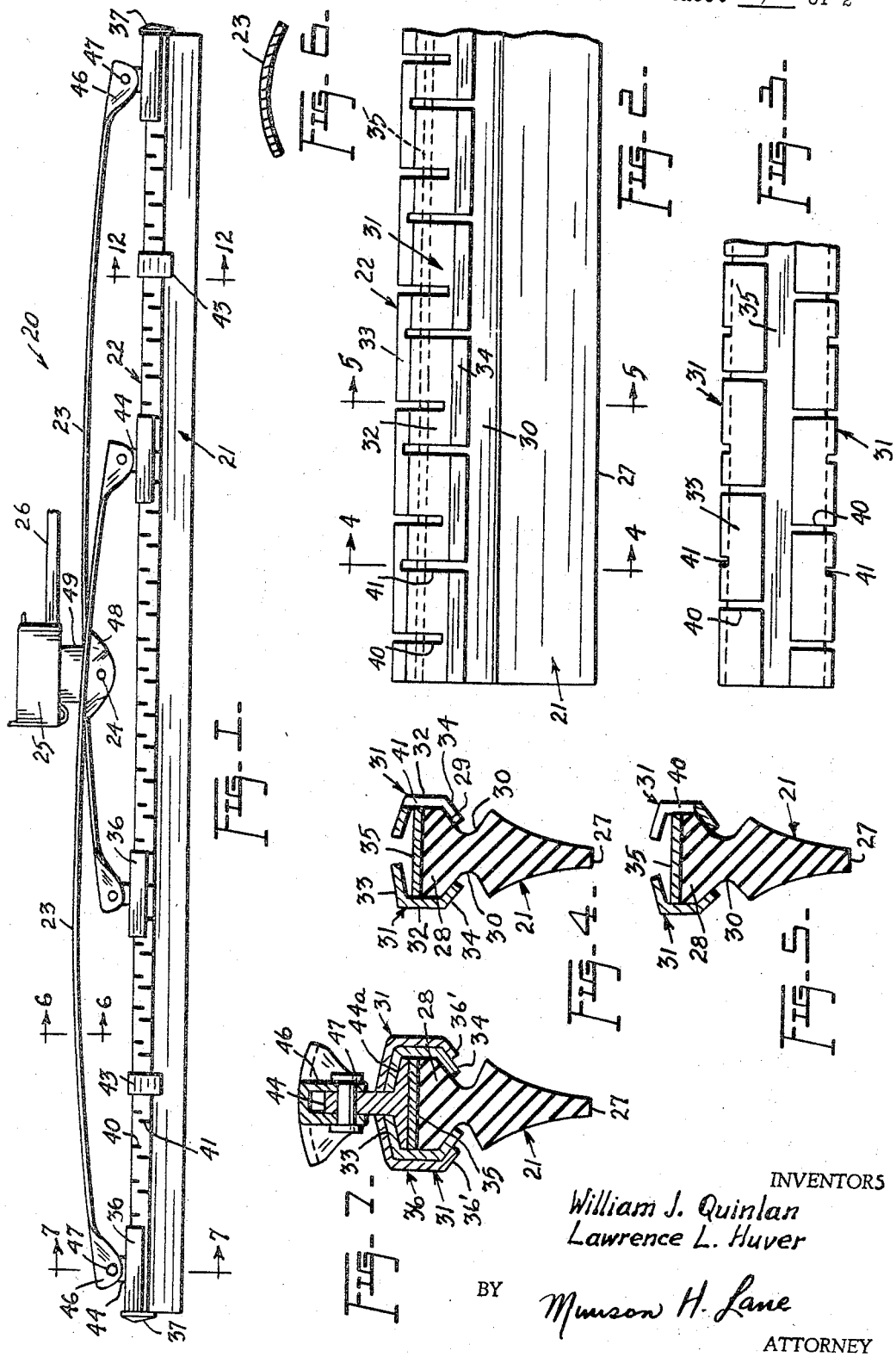

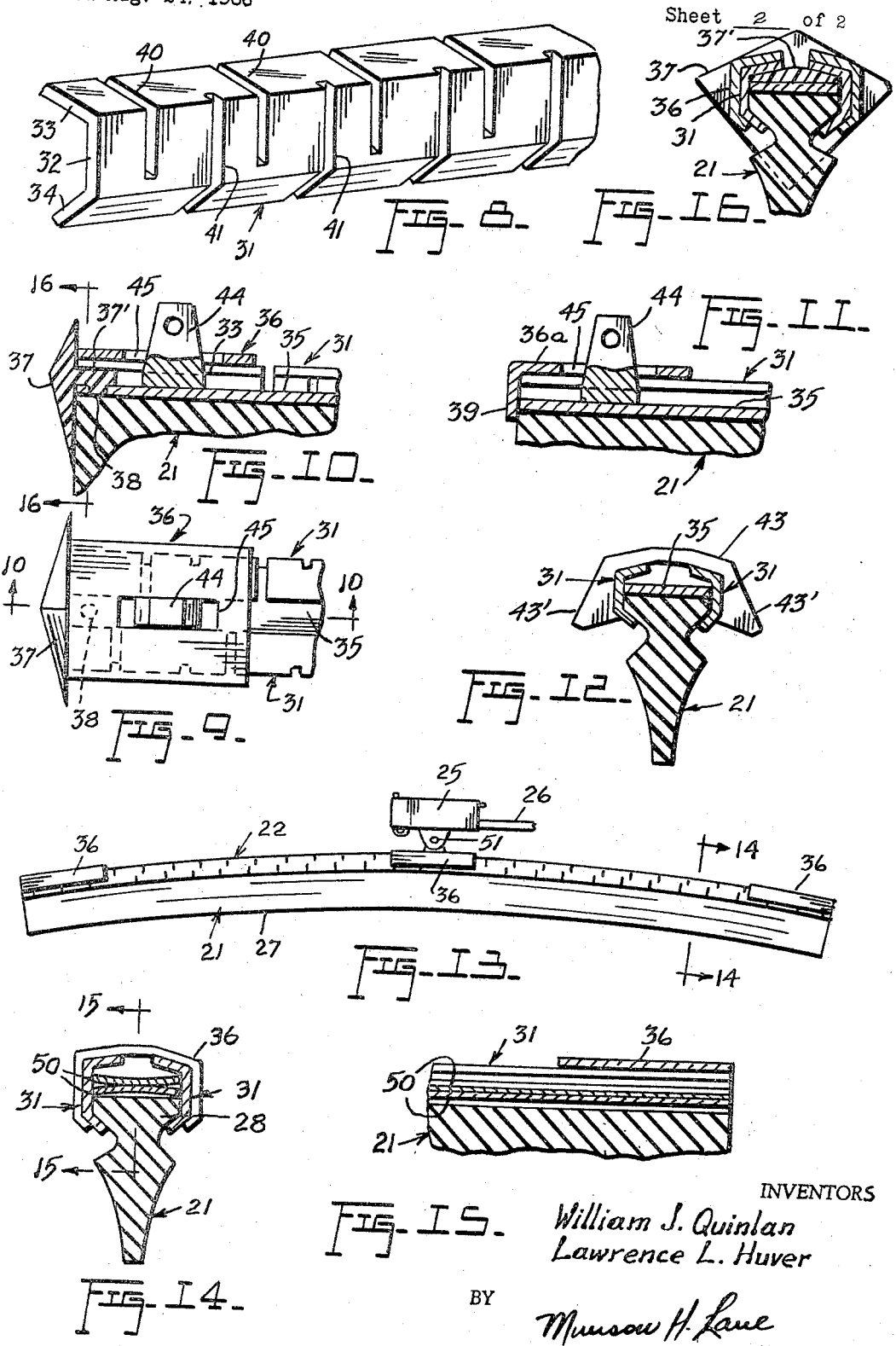

3,427,637
WINDSHIELD WIPER ASSEMBLIES—METAL BACKING STRIP
William J. Quinlan and Lawrence L. Huver, Hastings, Mich., assignors to Hastings Manufacturing Company, Hastings, Mich., a corporation of Michigan
Filed Aug. 24, 1966, Ser. No. 574,643
U.S. Cl. 15—250.42            22 Claims
Int. Cl. B60s 1/04; A47l 1/02

ABSTRACT OF THE DISCLOSURE

In a wiper blade assembly, the combination of an elongated blade body member of resiliently flexible material having a longitudinally extending supporting spine, a flexible elongated case supportably enclosing said spine, and means for attaching said case to a wiper arm, said case comprising separate opposite side portions each provided with series of longitudinally spaced slots perpendicular to the longitudinal plane of the case, whereby the case with the blade body member supported thereby may be flexed in the direction of said slots but is substantially rigid in the lateral direction.

---

This invention relates to new and useful improvements in windshield wiper blade assemblies, particularly those used on curved windshields, an example of one such blade assembly being disclosed in Patent No. 3,121,903 of Arthur L. Ludwig, dated Feb. 25, 1964.

The principal object of this invention is to provide a wiper blade assembly wherein the blade body member has an improved supporting case or backing member arranged so as to afford maximum flexibility toward the windshield and thus assure proper and efficient wiping action, while the case remains substantially rigid in a lateral direction.

Another important object of the invention is to enhance the appearance of the blade assembly by lowering its profile.

Another important object is to provide an improved structural arrangement of parts which may be economically manufactured and assembled with ease and expediency.

A further object of the invention is to provide means for preventing marring or scratching of the windshield.

In accordance with a preferred embodiment of the invention, the wiper blade supporting case or backing member is formed from two separate preferably metallic side support members of substantially U-shaped cross-section which are separated by an intermediate spacing member, web, strip or base and clamped together by suitable clamping means or clips.

Each of the side members is provided with a pre-determined number of spaced slots, said slots being arranged in two series, the slots of one series being staggered with reference to the slots of the other series. The slots of one series extend from one edge of its respective side member and the slots of the other series extend from the other edge of the side member. Each of the slots preferably includes a portion normal to the plane of the intermediate spacing member and a portion parallel or oblique to the plane of said web portion.

The slots may be evenly spaced or arranged at irregular intervals. Thus, there may be an equal slot progression (slots arranged at equal intervals) extending from one end of the side support member to the opposite end or there may be unequal progression or a combination of equal and unequal progression. Also the slots may be located at the inboard and outboard ends only of the side support member leaving the center portion rigid, or a different progression may be used through this section, for example, the slots may be more closely spaced at the end and at the center, in order to provide greater flexibility at the end portions.

In order to prevent scratching of the glass by the windshield wiper, anti-scratching devices, which may be in the form of plastic clips or clamps and end pieces or caps extending outwardly from the blade, may be provided, the clips serving also to assist in holding the side pieces or support members together and the end pieces or caps serving also as attaching means for the usual support bars or members.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIG. 1 is a side elevational view of the improved wiper blade assembly;

FIG. 2 is an enlarged, fragmentary side elevational view of the blade body member and supporting case;

FIG. 3 is a fragmentary top plan view of the subject shown in FIG. 2;

FIG. 4 is a cross-sectional view, taken substantially in the plane of the line 4—4 in FIG. 2;

FIG. 5 is a cross-sectional view, taken substantially in the plane of the line 5—5 in FIG. 2;

FIG. 6 is an enlarged cross-sectional detail, taken substantially in the plane of the line 6—6 in FIG. 1;

FIG. 7 is an enlarged cross-sectional view, taken substantially in the plane of the line 7—7 in FIG. 1;

FIG. 8 is an enlarged, fragmentary perspective view of one of the case side sections;

FIG. 9 is a fragmentary top plan view of the assembled case, clamping means and support bar attaching lug;

FIG. 10 is a fragmentary sectional view, taken substantially in the plane of the line 10—10 in FIG. 9;

FIG. 11 is a view, similar to that in FIG. 10, but showing a modified arrangement;

FIG. 12 is an enlarged cross-sectional view, taken substantially in the plane of the line 12—12 in FIG. 1;

FIG. 13 is a side elevational view, on a reduced scale, of a modified embodiment of the blade assembly;

FIG. 14 is an enlarged cross-sectional view, taken substantially in the plane of the line 14—14 in FIG. 13;

FIG. 15 is a fragmentary sectional view, taken substantially in the plane of the line 15—15 in FIG. 14; and FIG. 16 is a fragmentary sectional detail, taken substantially in the plane of the line 16—16 in FIG. 10.

Referring now to the accompanying drawings in detail, more particularly to FIG. 1 thereof, the windshield wiper blade assembly is designated generally by the reference numeral 20. Broadly, the same comprises a blade body member 21 of an elongated form, which is supported by an elongated case or backing member 22. The case 22 has attached thereto a pair or support members or bars 23 which are longitudinally overlapped and pivotally attached as at 24 to a connector 25 at the end of a wiper arm 26, as will be clearly apparent.

As detailed in FIGS. 2-5 and 7-12, the construction of the blade body member 21 and case or backing member 22 will now be described. The blade member is formed from suitable resiliently flexible material such as natural or synthetic rubber, plastic, or the like. One longitudinal edge 27 thereof constitutes the wiping edge, while its other longitudinal edge portion forms a relatively wide supporting spine 28 having convergent edge portions 29 sloping into recesses or grooves 30 extending longitudinally in the opposite sides of the blade body member. As such, the blade body member is substantially the same as that disclosed in the aforementioned Patent 3,121,903.

The blade supporting case or backing member 22 comprises a pair of elongated, complemental side sections 31 which are separate from each other. Each case side section includes a lateral wall 32 integral with upper and lower flanges 33, 34, respectively, the upper flanges 33 being inclined upwardly and inwardly and the lower flanges 34 slanting inwardly and downwardly so as to supportably engage the edge portions 29 of the spine 28 when the two case side sections 31 are applied to the opposite sides of the blade body member as shown in the drawings. The case side sections 31 are applied to the opposite sides of although plastic type material may be used, if desired.

An elongated, resiliently flexible web or strip 35, also preferably of metal, though plastic type material may be used, if desired, is positioned in the case between the side sections 31 so as to overlie the spine 28 of the blade body member 21, with the lateral walls 32 of the side sections abutting the opposite longitudinal edges of the web. As shown, for example in FIG. 4, the web 35 may have a flat cross-section, although a web with a cross-sectional curvature may be utilized as hereinafter described. The web or strip 35 serves to space the side walls apart, and assist in preventing lateral flexing of the blade supporting case 22.

Means are provided for holding the case side sections 31 and the web 35 in assembled relation on the spine 28 of the blade body member 21, such means comprising a plurality of inverted channel-shaped clamp members 36 which are applied at longitudinally spaced points to the case so that they exteriorly embrace the side sections 31 as is best shown in FIG. 7. It will be noted that the members 36 fit the side sections 31 in a complemental manner and that edge portions 36' of the members 36 retainingly engage the lower flange 34. The clamp members 36 are firmly held in place on the case sections 31 by a frictional engagement which prevents the members 36 from sliding longitudinally along the case. Conveniently, two of the clamp members 36 are located at the ends of the case while two more are disposed intermediate the ends, as will be apparent from FIG. 1.

Those of the clamp members 36 at the ends of the case 22 may be equipped with terminal pieces 37 of plastic, hard rubber or other suitable non-metallic material which will not mar the windshield, in order to protect the windshield from possible scratching by the metal case and/or clamp members. The terminal pieces 37 have portions 37' slidably fitted into the case between the web 35 and the upper flanges 33 as shown in FIGS. 10 and 16, the portions 37' being provided with detent 38 engaging apertures formed in the end portions of the web 35 so as to prevent the terminal pieces from becoming separated from the case. As will be noted in FIGS. 9, 10 and 16, the terminal pieces 37 are substantially diamond-shaped and are larger than the cross-section of the clamp members 36, so that they project upwardly as well as laterally beyond the clamp members in order to prevent the clamp members themselves from contacting the windshield.

The terminal pieces 37 additionally serve to prevent the blade body member 21, the case side sections 31 and the web 35 from sliding longitudinally relative to one another, but if the terminal pieces are not used, such relative longitudinal sliding of the components may be prevented by providing downturned lips or flanges 39 at the terminal ends of the clamp members 36a, as illustrated in FIG. 11. The lips 39 overlap or abut the ends of the components 21, 31 and 35, so that relative sliding thereof is not possible.

As is best shown in FIG. 8, each of the case side sections 31 is provided with series of slots 40, 41 located at longitudinally spaced points along the side section. The slots 40 extend perpendicularly in the lateral wall 32 and through the upper flange 33 where they terminate in open ends at the longitudinal edge of that flange. The slots 41, which alternate with the slots 40, extend perpendicularly in the lateral wall 32 and through the lower flange 34 where they terminate in open ends at the longitudinal edge of the last mentioned flange. The provision and arrangement of the slots 40, 41 permits the case 22 and the associated blade body member 21 to flex in a perpendicular direction, that is, toward the windshield, but the case is substantially rigid or inflexible in the lateral direction, this being aided by the web or strip 35. The perpendicular flexing is, of course, desirable to assure proper and efficient contact of the wiping edge 27 with the windshield, and by utilizing the slotted case side members as described, the desired flexibility is obtained when the case side members are made of metal rather than of some other material such as inherently flexibile plastic which might flex in the desired perpendicular as well as in the undesired lateral direction.

It will be apparent that when the blade is curved from the straight form shown in FIG. 1 toward the windshield, the open ends of the slots 40 will become slightly expanded while the open ends of the slots 41 will become slightly compressed. The progressive spacing of the slots is such as to afford maximum flexibility in the direction of the windshield and it may be noted that if certain longitudinal portions of the blade, as for example the end portions, are desired to be more flexible than others, as for example the central portion, the slots in the end portions may be more closely spaced than those in the central portion, or the slots in the central portion may be omitted.

In the event that the clamping members 36 are so far apart as to make it desirable for additional clamping members to be provided between them in order to properly hold the blade components in assembly, such additional clamping members may assume the form of simple clamps 43, frictionally applied to the case side sections 31 as shown in FIGS. 1 and 12 in a similar manner as the clamping members 36.

The clamps 43 are preferably formed from plastic, hard rubber, or other suitable non-metallic material, and are formed integrally with laterally projecting wings 43' which project beyond the cross-section of the case side sections 31 to engage the windshield and thereby protect the latter against scratching by the metal case if for some reason the blade assembly should become laterally tilted at the ends of its oscillating movement on the windshield.

Means are provided for attaching the case 22 to the support bars 23 and hence to the wiper arm 26, such means as shown comprising pairs of apertured lugs 44 which have integral base portions 44a longitudinally slidably fitted in the case 22 between the web 35 and the upper flanges 33 of the case side members 31, as is best shown in FIG. 7. The base portions 44a are contained within the respective clamping members 36 and the clamping members are provided at the top thereof with slots 45 through which the lugs 44 project upwardly and outwardly, as shown in FIGS. 9 and 10. The slots 45 are long enough to permit a limited amount of longitudinal sliding of the lugs 44 relative to the case, as already mentioned. This particular connector per se is not our invention, but is the invention of A. L. Ludwig. Instead of this construction, the connecting means 16 of the Ludwig Patent No. 3,121,903 may be employed if desired.

Each of the aforementioned support bars 23 has its end portions angulated into an inverted U-shape as indicated at 46 and the portions 46 of each bar are pivoted at 47 to a pair of the lugs 44, as will be apparent from FIG. 7. The bars 23 are longitudinally curved as shown and have a convexo-concave cross-section as illustrated in FIG. 6 for purposes of substantial rigidity. The bars are longitudinally overlapped and their overlapped portions are formed with downturned ears 48 for pivotal connection by the pivot means 24 to a support plate 49 depending from the aforementioned connector 25. This arrangement is similar to that disclosed in the aforesaid Patent No. 3,121,903, except that herein the bars 23 have a convexo-concave cross-section rather than a flat cross-section, and that the ears 48 are downturned rather than upturned from the bars, so that the profile of the wiper assembly is materially reduced for enhancement of appearance.

FIGS. 13-15 illustrate a modified embodiment of the invention wherein the blade body member 21 and the slotted case side sections 31 are held in assembled relation by the clamping members 36, but the web inside the case consists of a pair of elongated web members 50 which, rather than being flat, have a convexo-concave cross-section and are superposed with their convex surfaces in contact with each other, as shown in FIG. 14. Moreover, the web members 50 are preformed to a longitudinal curvature so that they bias the case 22 and the blade body member 21 into a corresponding, longitudinally curved form, more-or-less complemental to the curvature of the windshield. In this embodiment of the device it is not necessary to employ support arms or bars (such as the bars 23) to press the blade against the windshield, and accordingly, such support bars are omitted and the blade assembly is attached to the wiper arm connector 25 solely by a single pivot 51 on one of the clamping members 36 which is located substantially at the longitudinal center of the blade.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In a wiper blade assembly, the combination of an elongated blade body member of resiliently flexible material having a longitudinally extending supporting spine, a flexible elongated case supportably enclosing said spine, and means for attaching said case to a wiper arm, said case comprising separate opposite side portions each provided with series of longitudinally spaced slots perpendicular to the longitudinal plane of the case, whereby the case with the blade body member supported thereby may be flexed in the direction of said slots but is substantially rigid in the lateral direction.

2. The device as defined in claim 1 wherein the side portions of said case include lower flanges supportably engaging the spine of said blade body member and also include upper flanges, the slots in each side portion being open alternately at the respective upper and lower flanges thereof.

3. In a wiper blade assembly, the combination of an elongated blade body member of resiliently flexible material having a longitudinally extending supporting spine, an elongated case supportably enclosing said spine, and means for attaching said case to a wiper arm, said case having opposite side portions thereof provided with series of longitudinally spaced slots perpendicular to the longitudinal plane of the case, whereby the case with the blade body member supported thereby may be flexed in the direction of said slots but is substantially rigid in the lateral direction, said side portions of said case comprising two separate side sections, together with means for holding said case side sections in assembled relation on the spine of said blade body member.

4. In a wiper blade assembly, the combination of an elongated blade body member of resiliently flexible material having a longitudinally extending supporting spine, an elongated case supportedly enclosing said spine, and means for attaching said case to a wiper arm, said case having opposite side portions thereof provided with series of longitudinally spaced slots perpendicular to the longitudinal plane of the case, whereby the case with the blade body member supported thereby may be flexed in the direction of said slots but is substantially rigid in the lateral direction, said side portions of said case comprising two separate side sections, said case also including an elongated resiliently flexible spacing web interposed between said case side sections, and means for holding the case side sections and said web in assembled relation on the spine of said blade body member.

5. In a wiper blade assembly, the combination of an elongated blade body member of resiliently flexible material having a longitudinally extending supporting spine, an elongated case supportably enclosing said spine, and means for attaching said case to a wiper arm, said case having opposite side portions thereof provided with series of longitudinally spaced slots perpendicular to the longitudinal plane of the case, whereby the case with the blade body member supported thereby may be flexed in the direction of said slots but is substantially rigid in the lateral direction, said side portions of said case comprising two separate side sections each having a lower flange in supporting engagement with the spine of said blade body member and also having an upper flange, the slots in each case side section being open alternately at the upper and lower flanges thereof, said case also including an elongated resiliently flexible spacing web interposed between said case side sections, and means for holding the case side sections and said web in assembled relation on the spine of the blade body member.

6. The device as defined in claim 5 wherein each case side section also includes a lateral wall connecting said upper and lower flanges, the lateral walls of said case side sections abutting opposite longitudinal side edges of said web.

7. The device as defined in claim 5 wherein said holding means comprise a plurality of clamp members provided at longitudinally spaced points on said case and embracing the case side sections in assembled relation.

8. The device as defined in claim 5 wherein said holding means comprise at least one clamp embracing said case side sections in assembled relation, said clamp being formed from non-scratching material and including windshield engaging wings projecting laterally beyond the case side sections.

9. The device as defined in claim 5 wherein said web has a flat cross-section.

10. The device as defined in claim 5 wherein said web has a convexo-concave cross-section.

11. The device as defined in claim 5 wherein said web comprises a pair of superposed web members of a convexo-concave cross-section having their convex surfaces in contact with each other.

12. The device as defined in claim 5 together with terminal pieces provided at the ends of said case, said terminal pieces being formed from non-scratching material and projecting laterally beyond the cross-section of the case to prevent the latter from scratching a windshield.

13. In a wiper blade assembly, the combination of an elongated blade body member of resiliently flexible material having a longitudinally extending supporting spine, an elongated case supportably enclosing said spine, said case comprising an elongated resiliently flexible web overlying the spine, a pair of separate case side sections each having a lateral wall with inwardly projecting upper and lower flanges, the lateral walls of said case side sections abutting opposite longitudinal side edges of said web and the lower flanges thereof supportably engaging the spine of said blade body member, and means provided at longitudinally spaced points on said case for holding the case side sections and said web in assembled relation on the blade body member spine, each of said case side sections being provided with a series of longitudinally spaced slots extending perpendicularly in the side section lateral wall and alternately through the upper and lower flanges, said slots being open alternately at longitudinal edges of the upper and lower flanges whereby the case with the blade body member supported thereby may be flexed in the perpendicular direction of said slots but is substantially rigid in the lateral direction.

14. The device as defined in claim 13 wherein said holding means comprise a plurality of clamp members provided exteriorly on and embracing said case side sections.

15. The device as defined in claim 13 together with means for attaching said case to a wiper arm, said attaching means comprising pairs of apertured lugs having base portions longitudinally slidably positioned in said case between said web and the upper flanges of the case side sections, said lugs projecting upwardly and outwardly from between said upper flanges, a plurality of resiliently flexible support bars each having a pair of said lugs pivotally connected to the ends thereof, said support bars being longitudinally overlapped, and a wiper arm connector pivotally attached to the overlapped portions of said bars.

16. The device as defined in claim 15 wherein said holding means comprise a plurality of clamp members provided exteriorly on and embracing said case side sections, the base portions of said lugs being contained within the respective clamp members and the clamp members being formed with slots having the lugs projecting outwardly therethrough.

17. The device as defined in claim 16 wherein said support bars have a convex-concave cross-section.

18. The device as defined in claim 13 wherein said web is preformed with a longitudinal curvature whereby to sustain said case and the associated blade body member correspondingly curved.

19. The device as defined in claim 18 wherein said web comprises a pair of superposed web members of a convexo-concave cross-section having their convex surfaces in contact with each other.

20. The device as defined in claim 18 together with means for attaching said case to a wiper arm, said attaching means comprising a wiper arm connector pivotally attached to the case intermediate the ends of the latter.

21. The device as defined in claim 20 wherein said holding means include a clamp member provided exteriorly on and embracing said case side sections intermediate the ends of the case, the wiper arm connector of said attaching means being pivotally attached to said clamp member.

22. In a wiper blade assembly, the combination of an elongated blade body member of resiliently flexible material having a longitudinally extending supporting spine, a flexible elongated case supportably enclosing said spine, and means for attaching said case to a wiper arm, said case comprising separate opposite side sections, each being provided at least along a portion of their length with series of longitudinally spaced slots perpendicular to the longitudinal plane of the case, said slots opening alternately at the top and bottom of the case whereby the case with the blade body member supported thereby may be flexed in the direction of said slots but is substantially rigid in the lateral direction.

References Cited

UNITED STATES PATENTS

| | | | |
|---|---|---|---|
| 2,667,656 | 2/1954 | Oishei | 15—250.42 |
| 2,750,617 | 6/1956 | Oishei | 15—250.42 |
| 3,029,460 | 4/1962 | Hoyler | 15—250.42 |

FOREIGN PATENTS

| | | |
|---|---|---|
| 707,559 | 4/1954 | Great Britain. |

PETER FELDMAN, *Primary Examiner.*